US008683514B2

(12) United States Patent
Di Mattia et al.

(10) Patent No.: US 8,683,514 B2
(45) Date of Patent: Mar. 25, 2014

(54) ENHANCED MEDIA CONTENT TRANSPORT STREAM FOR MEDIA CONTENT DELIVERY SYSTEMS AND METHODS

(75) Inventors: James F. Di Mattia, Churchville, MD (US); Michael P. Ruffini, Methuen, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 445 days.

(21) Appl. No.: 12/820,803

(22) Filed: Jun. 22, 2010

(65) Prior Publication Data

US 2011/0314496 A1   Dec. 22, 2011

(51) Int. Cl.
*H04N 7/173* (2011.01)
(52) U.S. Cl.
USPC ............................................. 725/36; 709/219
(58) Field of Classification Search
USPC ................................ 725/32–36; 209/217–232
See application file for complete search history.

(56) References Cited

U.S. PATENT DOCUMENTS

| | | | | |
|---|---|---|---|---|
| 6,144,375 | A * | 11/2000 | Jain et al. ........................ | 715/251 |
| 6,698,020 | B1 * | 2/2004 | Zigmond et al. ................ | 725/34 |
| 7,600,250 | B2 | 10/2009 | Carr | |
| 2003/0202124 | A1 * | 10/2003 | Alden ............................. | 348/722 |
| 2008/0313669 | A1 | 12/2008 | Acharya et al. | |
| 2010/0027550 | A1 | 2/2010 | Candelore et al. | |
| 2010/0122305 | A1 | 5/2010 | Moloney | |
| 2010/0138889 | A1 | 6/2010 | Subramanian et al. | |
| 2011/0067071 | A1 * | 3/2011 | Karaoguz et al. ............... | 725/60 |

OTHER PUBLICATIONS

Wikipedia, MPEG-2, 16 pages, http://en.wikipedia.org/wiki/MPEG-2, as accessed on Jun. 22, 2010.
Wikipedia, MPEG Transport Steam, 9 pages, http://en.wikipedia.org/wiki/MPEG transport stream, as accessed on Jun. 22, 2010.
Wikipedia, Multiview Video Coding, 2 pages, http://en.wikipedia.org/wiki/Multiview Video Coding, as accessed on Jun. 22, 2010.
Wikipedia, H.264/MPEG-4 AVC, 14 pages, http://en.wikipedia.org/wiki/H.264/MPEG-4 AVC, as accessed on Jun. 22, 2010.
Wikipedia, Free Viewpoint Television, 2 pages, http://en.wikipedia.org/wiki/Free viewpoint television, as accessed on Jun. 22, 2010.

* cited by examiner

*Primary Examiner* — Annan Shang

(57) ABSTRACT

An exemplary method includes a media content delivery system transmitting an enhanced media content transport stream that includes at least a single program stream that carries data representative of multiple video content programs. The enhanced media content transport stream further includes data specifying multiple video program identifiers for the multiple video content programs, each of the multiple video program identifiers configured to be used by an access subsystem that receives the enhanced media content transport stream to selectively access a different one of the multiple video content programs. In certain embodiments, the multiple video content programs comprise a first video content program including video data for a main media content program and a second video content program including video data for an advertisement. Corresponding methods and systems are also disclosed.

20 Claims, 12 Drawing Sheets

ENHANCED MEDIA CONTENT TRANSPORT STREAM FOR MEDIA CONTENT DELIVERY SYSTEMS AND METHODS

BACKGROUND INFORMATION

MPEG-2 is a standard specified by Motion Pictures Expert Group that is commonly used to transport media content (e.g., video and/or audio content) to set-top-box devices and/or other media content access devices ("access devices"). Typically, a media content provider transmits one or more MPEG-2 transport streams carrying media content to one or more access devices, which may receive and process the MPEG-2 transport streams to access media content carried in the streams.

An MPEG-2 transport stream may carry data representative of a single media content program or multiple media content programs. For each media content program in an MPEG-2 transport stream, a single program stream within the transport stream carries data representative of the media content program. The program stream may be associated with a media program channel such that an access device receiving the MPEG-2 transport stream may select the media program channel in order to access the media content program carried in the program stream.

In a conventional MPEG-2 transport stream, each program stream typically includes a combination of a single elementary video stream, one or more elementary audio streams, and one or more elementary data streams that carry video, audio, and other data representative of the media content program carried by the program stream. However, the inclusion of only a single elementary video stream in each program stream limits the options available to an access device and/or a user of the access device accessing a media content program. For example, when an access device selects (e.g., tunes to) a media program channel, the only video content program available to the access device on the selected channel is the single video content program within the single elementary video stream included in the program stream associated with the selected channel. In order to access a different video content program, the access device has to select a different media program channel in the transport stream or in another transport stream received by the access device. However, selecting a different media program channel may not always be desirable. Moreover, providing additional media program channels and/or streams is costly to a media content service provider (e.g., a television service provider).

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Exemplary media content delivery systems and methods are disclosed. The exemplary systems and methods described herein may generate, transmit, receive, process, and/or otherwise utilize enhanced media content transport streams. An enhanced media content transport stream may be configured to provide access to multiple video content programs carried by a single program stream included in the enhanced media content transport stream. For example, an enhanced media content transport stream, such as an enhanced MPEG-2 transport stream, may include multiple video program identifiers for multiple video content programs carried by a single program stream. Each video program identifier may be configured to be used by a media content access device that receives the enhanced media content transport stream to selectively access a different one of the multiple video content programs carried by the program stream, without having to select another program stream and/or media program channel on which another program stream is carried. Accordingly, an enhanced media content transport stream may support or otherwise provide for additional media content processing capabilities, applications, and/or features that are not supported by conventional media content transport streams such as conventional MPEG-2 transport streams. Examples of enhanced media content transport streams, as well as examples of capabilities, applications, and/or features supported by enhanced media content transport streams are described further below.

As used herein, the term "media content" may refer generally to any content that may be made accessible by a media content delivery system. Media content may include, but is not limited to, any media content program (e.g., any television program, on-demand media program, pay-per-view media program, broadcast media program such as a broadcast television program, multicast media program, and/or narrowcast media program, audio program, video program, or multimedia program), IPTV content, advertisement (e.g., commercial), video, movie, song, or any combination of these or other forms of media content that may be viewed or otherwise experienced by a user. As described herein, media content, such as one or more media content programs, may be transported by one or more streams to one or more access devices, which may receive and process the streams to selectively access the media content carried therein.

Exemplary media content delivery systems and methods will now be described with reference to the drawings.

Figure 1:
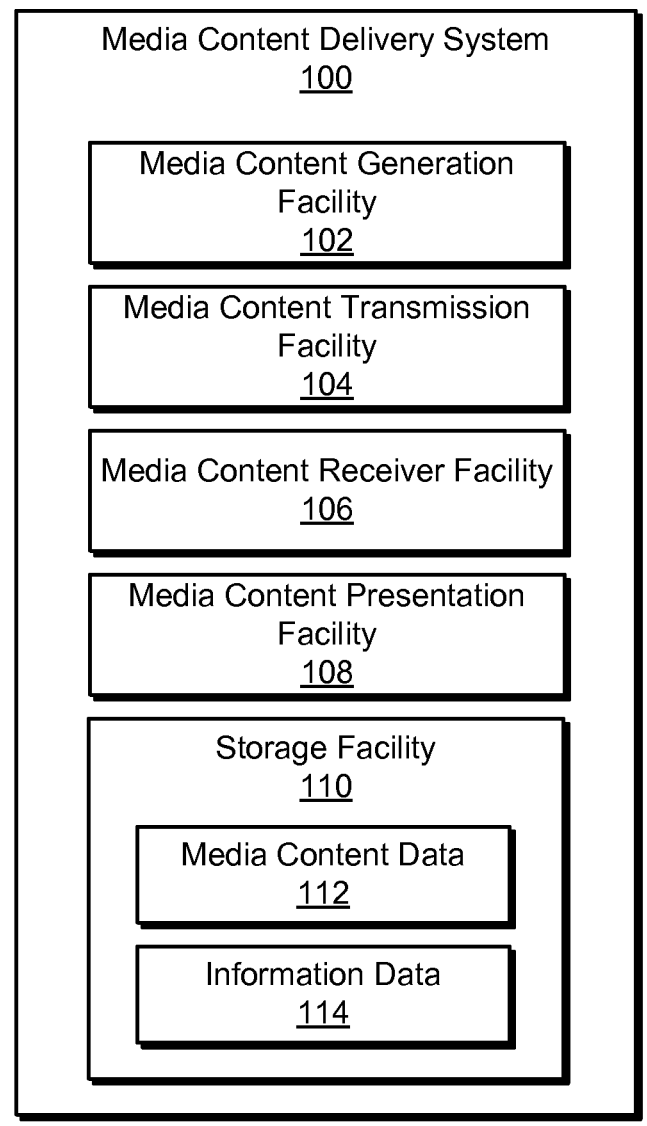
FIG. 1 illustrates an exemplary media content delivery system according to principles described herein.

FIG. 1 illustrates an exemplary media content delivery system 100 (or simply "system 100"). As shown, system 100 may include a media content generation facility 102 ("generation facility 102"), a media content transmission facility 104 ("transmission facility 104"), a media content receiver facility 106 ("receiver facility 106"), a media content presentation facility 108 ("presentation facility 108"), and a storage facility 110, which may communicatively coupled to and in communication with one another using any suitable communication technologies.

Generation facility 102 may be configured to generate an enhanced media content transport stream, such as an enhanced MPEG-2 transport stream. The generation of an enhanced media content transport stream may include generating and/or inserting one or more media program streams ("program streams") into the enhanced transport stream. In certain examples, each program stream may be inserted into a media program channel ("program channel") in the enhanced transport stream. A program stream included in the enhanced transport stream may include a combination of one or more elementary video streams, audio streams, and data streams that carry video, audio, and other data. A media content access device that receives the enhanced transport stream may select the program stream (e.g., by selecting the program channel on which the program stream is carried) to access the video, audio, and/or other data carried by the elementary streams within the program stream.

Conventionally, a single program stream in a standard media content transport stream such as a standard MPEG-2 transport stream includes only one video content program. As described herein, a single program stream included in an enhanced transport stream may carry multiple video content programs associated with multiple video program identifiers that may be used by a media content access device that receives the enhanced transport stream to selectively identify and access one or more of the multiple video content programs carried by the program stream.

Figure 2:
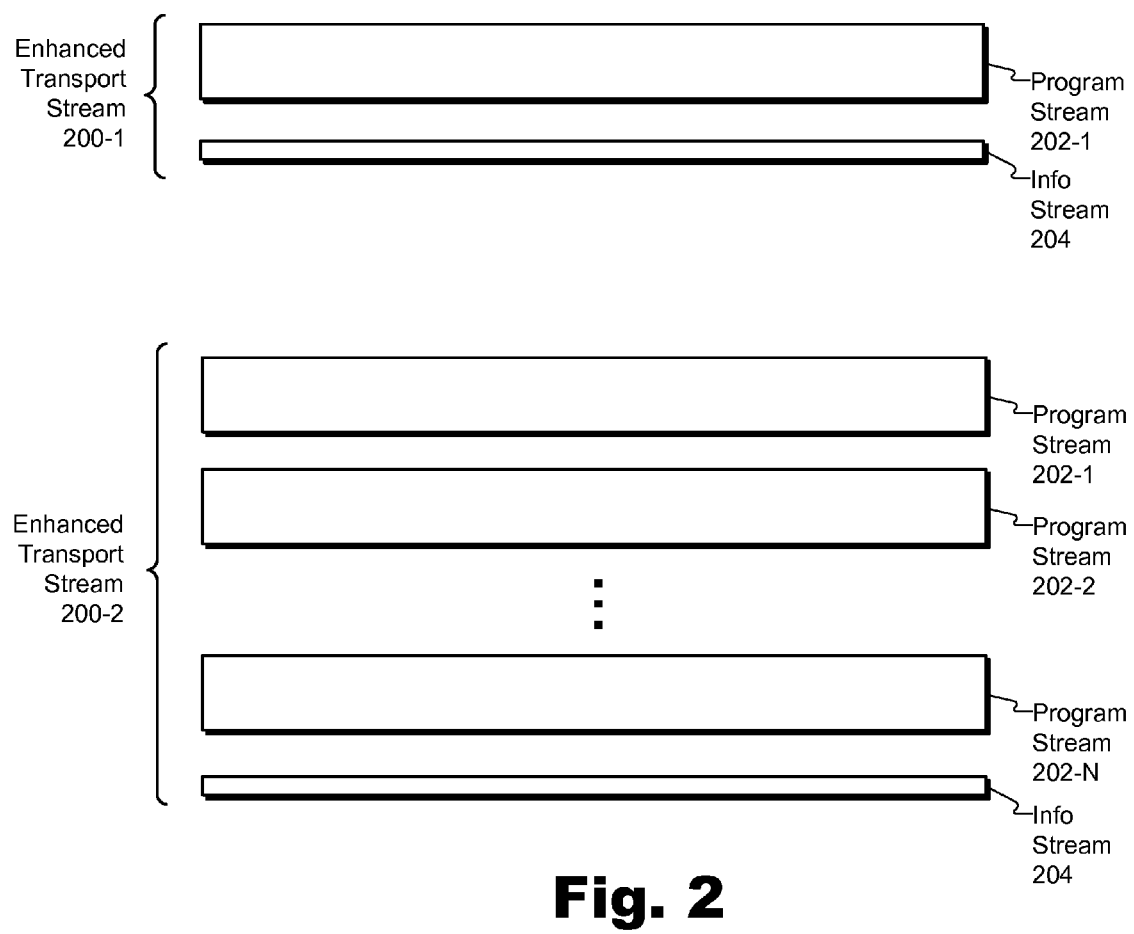
FIG. 2 illustrates exemplary enhanced media content transport streams according to principles described herein.

To illustrate, FIG. 2 shows exemplary enhanced media content transport streams 200 (e.g., enhanced streams 200-1 and 200-2) according to principles described herein. Transport stream 200-1 represents an enhanced transport stream that includes a single program stream 202-1 and an information stream 204. Transport stream 200-2 represents an enhanced transport stream that includes multiple program streams 202 (e.g., program streams 202-1 through 202-N) and an information stream 204. In certain exemplary embodiments, enhanced transport streams 200 may be enhanced MPEG-2 transport streams.

Transport streams 200 are enhanced in that they each include at least a single program stream 202 that carries multiple video content programs. This is distinguished from and improves upon a standard MPEG-2 transport stream that by definition associates each program stream included in the transport stream with only a single video content program. Accordingly, an access device selecting a particular program stream included in a standard MPEG-2 transport stream has to select a different program stream (e.g., by tuning from one program channel to another program channel) in order to access a different video content program. In contrast, an access device selecting a particular program stream in an enhanced MPEG-2 transport stream defined in accordance with principles described herein may access a different video content program while the particular program stream is still selected.

Figure 3:
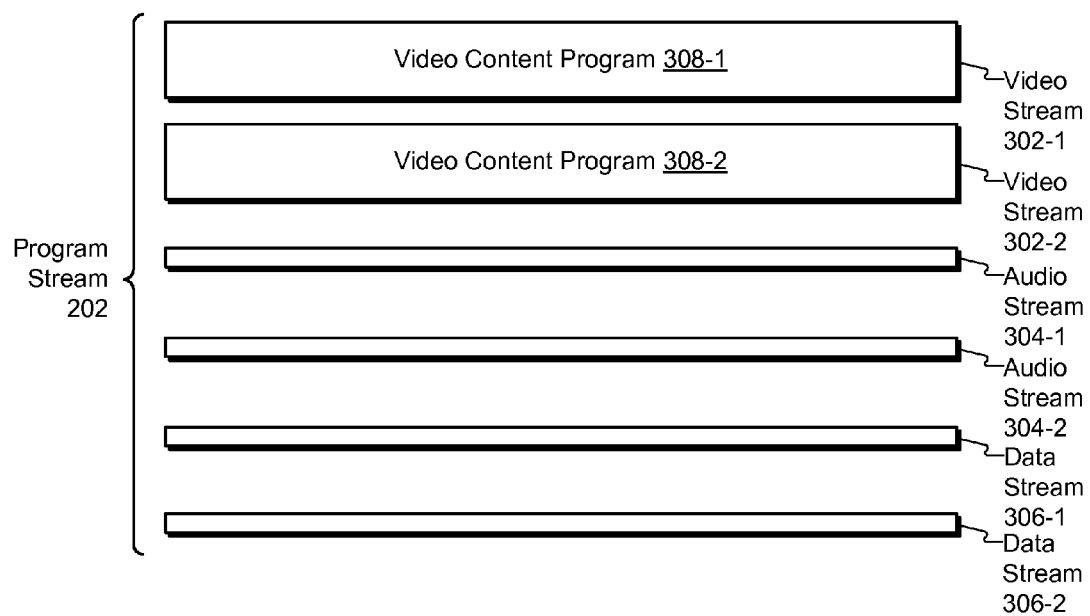
FIG. 3 illustrates an exemplary program stream that may be included in an enhanced media content transport stream according to principles described herein.
Figure 4:
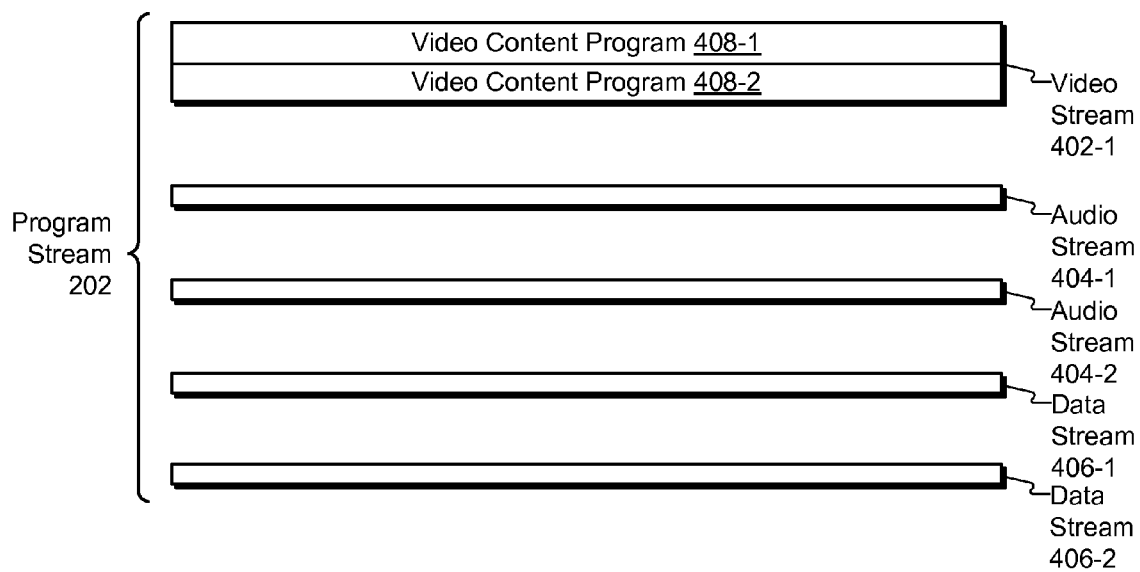
FIG. 4 illustrates another exemplary program stream that may be included in an enhanced media content transport stream according to principles described herein.

FIGS. 3-4 illustrate exemplary program streams 202 each carrying data representative of multiple video content programs. Each program stream 202 may include a combination of elementary streams that carry media content and data associated with the media content. As shown in FIG. 3, for example, an exemplary program stream 202 may include multiple elementary video streams 302 (e.g., video streams 302-1 and 302-2), elementary audio streams 304 (e.g., audio streams 304-1 and 304-2), and elementary data streams 306 (e.g., data streams 306-1 and 306-2). Each elementary video stream 302 may carry a different video content program. For example, FIG. 3 shows elementary video stream 302-1 carrying a first video content program 308-1 and elementary video stream 302-2 carrying a second video content program 308-2. An access device that receives an enhanced transport stream 200 and selects the exemplary program stream 202 shown in FIG. 3 may be able to select from elementary video streams 302-1 and 302-2 to access video content program 308-1 carried by video stream 302-1, another video content program 308-2 carried by video stream 302-2, or both video content programs 308-1 and 308-2 carried by video streams 302-1 and 302-2. Any of the audio streams 304 included in the program stream 202 may carry audio content, and any of the data streams 306 included in the program stream 202 may carry data associated with video streams 302-1 and/or 302-2 as may suit a particular application. In certain embodiments, for example, audio streams 304 may carry audio content that may be synchronized with either of the video streams 302-1 and 302-2 by an access device. Alternatively, audio stream 304-1 may be associated exclusively with video stream 302-1, and audio stream 304-2 may be associated exclusively with video stream 302-2.

FIG. 4 illustrates another exemplary program stream 202 that includes multiple video content programs. As shown in FIG. 4, program stream 202 may include only a single elementary video stream 402-1 and one or more elementary audio streams 404 (e.g., audio streams 404-1 and 404-2) and elementary data streams 406 (e.g., data streams 406-1 and 406-2). Video stream 402-1 may include data representative of multiple video content programs. For example, FIG. 4 shows elementary video stream 402-1 carrying both a first video content program 408-1 and a second video content program 408-2. An access device that receives an enhanced transport stream 200 and selects the exemplary program stream 202 shown in FIG. 4 may be able to select from the multiple video content programs 408-1 and 408-2 carried by video stream 402-1 to access video content program 408-1 carried by video stream 402-1, another video content program 408-2 carried by video stream 402-1, or both video content programs 408-1 and 408-2 carried by video stream 402-1. This may be accomplished by the access device selectively processing only those video data packets included in elementary video stream 402-1 that are associated with the selected video content program(s).

An enhanced transport stream (e.g., enhanced transport stream 200-1 or 200-2) may include data configured to assist an access device in processing the enhanced transport stream. For example, an enhanced transport stream may include data representative of program identifiers that may be used by an access device receiving the enhanced transport stream to select which data in the enhanced transport stream to process. To illustrate, transmission of an enhanced transport stream is typically performed by transmitting transport stream packets carrying information and payload data. Each transport stream packet may include, within its information data, a program identifier that may be used by an access device receiving the packet to determine whether or not to process the packet.

Accordingly, an access device may receive transport stream and selectively process only certain packets of the transport stream in order to access a particular program stream and/or media content program included in the program stream. This allows the access device to ignore transport stream packets having program identifiers that are not associated with the program stream and/or media content program being accessed.

To assist an access device in determining which program identifiers to access for a particular program stream and/or media content program, an enhanced transport stream may include mapping information that may be accessed and used by the access device to identify one or more program identifiers associated with a program stream and/or a media content program. The mapping information may be carried by an information stream (e.g., information stream 204) included in an enhanced transport stream (e.g., enhanced transport stream 200-1 or 200-2) and/or in any other suitable way.

Figure 5:
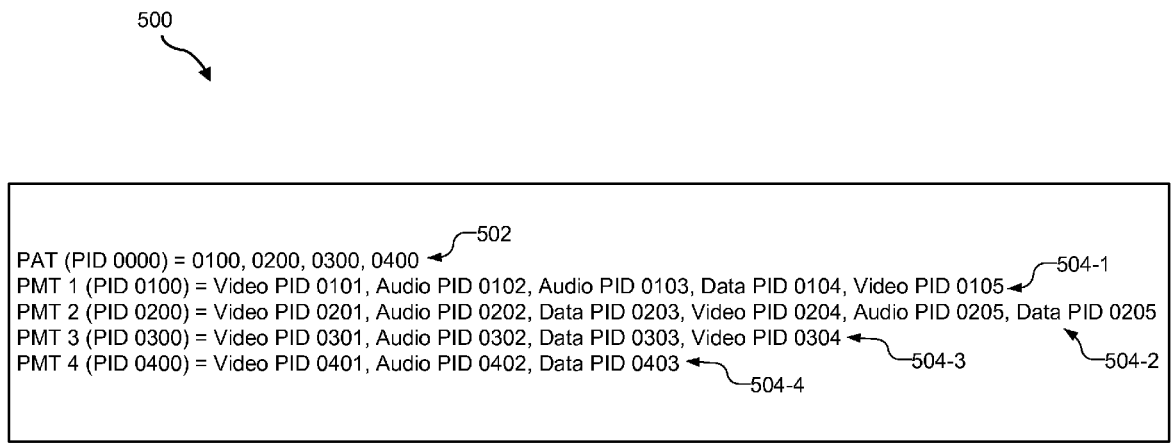
FIG. 5 illustrates an exemplary mapping table that may be included in an enhanced media content transport stream according to principles described herein.

FIG. 5 illustrates an exemplary mapping table 500 that may be included in an enhanced transport stream. An access device receiving the enhanced transport stream may access and use mapping table 500 to determine which program identifiers to detect in order to access and process transport stream packets associated with a particular program stream and/or media content program.

Mapping table 500 may include a program association table 502 ("PAT 502"), which may be associated with a particular program identifier value by definition (e.g., "PID 0000") such that a properly configured access device will look in the appropriate place to access PAT 502. In FIG. 5, PAT 502 makes up a first row of data in mapping table 500. PAT 502 may specify program identifiers for program streams included in the enhanced transport stream. In FIG. 5, PAT 502 specifies program identifiers values (e.g., "PID 0100," "PID 0200," "PID 0300," and "PID 0400") for four program streams included in an enhanced transport stream.

Mapping table 500 may further include a program mapping table 504 ("PMT 504") for each program stream included in the enhanced transport stream. In the illustrated example, for instance, mapping table 500 includes a first PMT 504-1 associated with a first program stream, a second PMT 504-2 associated with a second program stream, a third PMT 504-3 associated with a third program stream, and a fourth PMT 504-4 associated with a fourth program stream.

Each PMT 504 specifies one or more elementary streams associated with the program stream that corresponds to the PMT 504. For example, PMT 504-1 specifies that a first elementary video stream having a program identifier labeled "PID 0101," a second elementary video stream having a program identifier labeled "PID 0105," a first elementary audio stream having a program identifier labeled "PID 0102," a second elementary audio stream having a program identifier labeled "PID 0103," and a first elementary data stream having a program identifier labeled "PID 0104" are associated with a program stream having a program identifier labeled "PID 0100." In other words, elementary streams having program identifier values of "PID 0100" through "PID 0105" are associated with a program stream having a program identifier value of "PID 0100" in the enhanced transport stream.

An access device may be configured to use mapping information such as the mapping information in mapping table 500 to determine which program identifier values to detect and process. For example, an access device receiving an enhanced transport stream may be configured to access PAT 502 by detecting and processing transport stream packets having a program identifier value of "PID 0000." From such packets, the access device may determine program identifier values for program streams included in the enhanced transport stream. The access device may then use a program identifier value indicated in PAT 502 to access the PMT 504 associated with a program stream that is selected by the access device (e.g., a program stream carried by a program channel selected by the access device) by detecting and processing transport stream packets having the program identifier value associated with the PMT 504. From such packets, the access device may determine program identifier values for elementary streams included in the selected program stream. The access device may then use program identifier values indicated in the PMT 504 to access one or more of the elementary streams included in the selected program stream by detecting and processing transport stream packets having the program identifier values associated with the elementary streams. For instance, the access device may detect and process transport stream packets having program identifier values of "PID 0101," "PID 0102," "PID 0103," and "PID 0104" to process an elementary video stream, two elementary audio streams, and an elementary data stream included in the program stream corresponding to the PMT 504.

As mentioned, an enhanced transport stream may include multiple video program identifiers that may be used by an access device to access corresponding video content programs carried by a single program stream included in the enhanced transport stream. In FIG. 5, for example, PMT 504-1 specifies multiple video program identifiers ("Video PID 0101" and "Video PID 0105"), which may correspond to and be used to access multiple video content programs (e.g., video content programs 308-1 and 308-2 or video content programs 408-1 and 408-2) carried by a program stream. Similarly, one or more of the other PMTs 504 in mapping table 500 may specify multiple program identifiers corresponding to multiple video content programs. In FIG. 5, for example, PMT 504-2 and PMT 504-3 each specify multiple video program identifiers.

The inclusion of multiple video program identifiers in a single PMT (e.g., PMT 504-1) may enable an access device receiving an enhanced transport stream to utilize any of the multiple video program identifiers in the PMT to selectively access and process any of the multiple video content programs carried by the program stream associated with the PMT, without having to select another program stream. Accordingly, the access device may present any of the video content programs carried by the program stream either alone or in combination while the program stream is selected.

An elementary data stream (e.g., data stream 306-1, 306-2, 406-1, or 406-2) carried in a program stream may include data configured to instruct an access device as to how one or more elementary streams in the program stream are to be accessed and used. For example, an elementary data stream may indicate when a program stream is associated with multiple program identifiers and/or video content programs, as well as how to select from the multiple video content programs one or more of the video content programs for processing. To illustrate, an elementary data stream may include data specifying that a particular video program identifier in a PMT (e.g., a first-listed video program identifier) is to be used primarily or by default, and that another video program identifier in the PMT (e.g., a next-listed video program identifier) is to be used in response to an occurrence of a predefined trigger event, examples of which are described further below.

Returning to FIG. 1, generation facility 102 may be configured to generate an enhanced media content transport stream in any suitable way. For example, generation facility 102 may use raw media content data included in one or more elementary streams to generate one or more program streams which may then be packaged in an enhanced transport stream.

As another example, generation facility 102 may be configured to convert a standard media content transport stream (e.g., a standard MPEG-2 transport stream) into an enhanced media content transport stream (e.g., an enhanced MPEG-2 transport stream). To illustrate, a standard media content transport stream may be received from a media content provider. The standard media content transport stream may include a program stream that carries only a single video content program. Generation facility 102 may convert the standard media content transport stream to an enhanced transport stream by inserting data representative of at least one additional video content program into the program stream such that the program stream carries data representative of multiple video content programs (i.e., the single video content program and the additional video content program). The conversion may further include generation facility 102 inserting data representative of at least one additional program identifier associated with the additional video content program into the standard media content transport stream such that an access device may use the additional program identifier to access the additional video content program. Generation facility 102 may also insert any data in the transport stream that may be used by an access device to process the enhanced transport stream, including data configured to direct the access device in selecting which video content program(s) to select and access.

Transmission facility 104 may be configured to transmit an enhanced media content transport stream. Transmission of the enhanced media content transport stream may be performed in any suitable way and may be directed to any suitable receiver or receivers configured to process the enhanced media content transport stream.

Receiver facility 106 may be configured to receive and process an enhanced media content transport stream. For example, receiver facility 106 may receive an enhanced media content transport stream transmitted by transmission facility 104 and identify and process select content included in the enhanced media content transport stream. To illustrate, receiver facility 106 may be configured to identify and process a PAT included in the enhanced transport stream to identify a PMT associated with a program stream selected by receiver facility 106. Receiver facility 106 may then process the PMT associated with the program stream to identify program identifiers of elementary streams carried by the program stream. Receiver facility 106 may then use one or more of the program identifiers to access data carried by one or more of the elementary streams.

Receiver facility 106 may be configured to process a PMT that specifies multiple video program identifiers to determine, from the multiple video program identifiers, which of the multiple video content programs associated with the multiple video program identifiers is to be accessed and processed. Logic for such processing may be configured as may suit a particular application, and may be specified in the enhanced transport stream (e.g., in an elementary data stream carried by a program stream) as described above. As an example, receiver facility 106 may be configured to select, by default, a first-listed video program identifier specified in a PMT to use to access a first video content program associated with the first-listed video program identifier. In response to an occurrence of a predefined trigger event, receiver facility 106 may select to use a second-listed video program identifier specified in the PMT to access a second video content program associated with the second-listed video program identifier. The predefined trigger event may include a scheduled presentation of the second video content program, a receipt of user input requesting presentation of the second video content program, a start of an advertisement break associated with the first video content program, an interruption or error associated with the first video content program, and/or any other suitable trigger event.

In some examples, the predefined trigger event may include an embedded, dynamic trigger within a data stream. For example, an elementary data stream may carry a trigger configured to signal an access device to switch from accessing the first video content program to accessing the second video content program. Alternatively, the predefined trigger event may include an embedded, dynamic, in-band trigger within a video stream. For example, an elementary video stream carrying the first video content program may also carry a trigger configured to signal an access device to switch from accessing the first video content program to accessing the second video content program. The trigger in the data stream or the video stream may be acted upon by certain access devices and ignored by other access devices.

Presentation facility 108 may be configured to process and present media content accessed by receiver facility 106. In certain examples, the processing may include decoding and playing back one or more video content programs for viewing by a user. For instance, presentation facility 108 may decode and provide video data for one or more video content programs to a display device for display.

Storage facility 110 may be configured to maintain media content data 112 representative of media content that may be included in an enhanced media content transport stream and information data 114 that may be used to generate and/or process an enhanced media content transport stream. Information data 114 may include any data potentially useful for generating and/or processing an enhanced media content transport stream according to principles described herein. For example, information data 114 may include data indicating associations between program streams and programs channels on which the program streams are carried in an enhanced transport stream. Additionally or alternatively, information data 114 may include data that may be included in an enhanced transport stream that may be used by an access device receiving the enhanced transport stream to determine which program stream and elementary streams within the program stream to process. It will be recognized that storage facility 110 may maintain additional or alternative data as may serve a particular implementation.

As mentioned, an enhanced media content transport stream may support or otherwise provide for additional media content processing capabilities, applications, and/or features that are not supported by conventional media content transport streams such as conventional MPEG-2 transport streams. Several examples of such capabilities, applications, and/or features supported by enhanced media content transport streams will now be described. The examples are illustrative only and not limiting in any sense. An enhanced media content transport steam may support additional and/or alternative capabilities, applications, and/or features.

In certain embodiments, multiple video content programs carried by a program stream in an enhanced transport stream may represent various camera views of an event (e.g., a sporting event, a production of a show, a television game show, a reality television show, a video game event, a taping of an advertisement, etc. captured by one or more video cameras). For example, the multiple video content programs may include a first video content program representing a first camera view of an event and a second video content program representing a second camera view of the event. An access device that receives the enhanced transport stream may be configured to select from the multiple video content programs carried by the program stream to access one or more of the different camera views of the event represented by the multiple video content programs.

To illustrate, a content provider (e.g., ESPN) may generate video data representative of a first camera view of a sporting event and video data representative of a second camera view of the sporting event. An enhanced transport stream may be generated as described above to include a program stream that carries a first video content program representing the first camera view of the sporting event and a second video content program representing the second camera view of the sporting event. Accordingly, a user of an access device that receives the enhanced transport stream may be able to selectively access and experience the first camera view of the sporting event and/or the second camera view of the sporting event.

In certain embodiments, an access device that receives the enhanced transport stream may be configured to access and present the video data representative of the second camera view of the event in response to a predefined trigger event, which may include receipt of user input provided by the user of the access device to request a display of the second camera view, for example. To illustrate, the access device may present video data representative of the first camera view of the event. A user of the access device may provide input requesting that the second camera view of the event be displayed. The access device may detect the user input and respond by accessing and presenting video data representative of the second camera view of the event. The access and presentation of the video data representing the second camera view may be performed without the access device selecting (e.g., without the access device tuning to) a different program stream and/or program channel carrying a different program stream.

The access device may be configured to display video data representing one or more of the camera views in any suitable way. For example, the access device may be configured to seamlessly switch between two or more camera views of the event without having to select another program stream. As another example, the access device may be configured to concurrently display two or more camera views of the event, such as by displaying the camera views on different sections of a shared display screen or by displaying one camera view within a main section of a display screen and another camera view within a picture-in-picture window of the display screen.

In certain examples, the multiple video content programs carried by a program stream in an enhanced transport stream may represent various camera views of an advertisement. Accordingly, an access device that receives the enhanced transport stream may be configured to select from the multiple video content programs carried by the program stream to access one or more of the different camera views of the advertisement such that a user of access device may view the advertisement from one or more of the different camera views.

In certain embodiments, the access device may be configured to facilitate user selection of one or more camera views of the advertisement. For instance, the access device that receives the enhanced media content stream may detect that a program stream in the enhanced media content stream carries video data for multiple camera views of the advertisement (e.g., a first camera view and a second camera view of the advertisement). The access device may provide a notification configured to notify the user of the availability of multiple camera views of the advertisement. The user may provide and the access device may receive user input indicating which of the camera views of the advertisement the user wishes to view. In response, the access device may access and present one or more user-selected camera views of the advertisement. To illustrate, a user may be viewing a first camera view of an advertisement for an automobile. The access device may notify the user that at least one other camera view of the advertisement is available. The user may provider user input requesting a display of the other camera view of the advertisement. In response, the access device may access and present the other camera view of the advertisement, which may provide the user with a different view of the automobile.

Additionally or alternatively, in certain embodiments, multiple video content programs carried by a program stream in an enhanced transport stream may represent video data for a main media content program and video data for additional media content related to the main media content program. For example, the multiple video content programs may include a first video content program including video data for a main media content program such as a camera view of a sporting event and a second video content program including video data for additional media content related to the sporting event. For instance, the second video content program may include video data for a video representation of player statistics, team statistics, player highlights, and/or team highlights related to the sporting event.

In certain embodiments, an access device that receives the enhanced transport stream may be configured to access and present the video data representative of the additional media content related to the main media content program in response to a predefined trigger event, which may include receipt of user input provided by the user of the access device to request a display of the additional media content. To illustrate, the access device may present video data representative of a main media content program (e.g., a camera view of a sporting event). A user of the access device may provide input requesting that additional media content related to the main media content program be displayed. The access device may detect the user input and respond by accessing and presenting video data representative of the additional media content (e.g., a video representation of additional media content related to the sporting event). The access and presentation of the video data representing the additional media content may be performed without the access device selecting (e.g., without tuning to) a different program stream and/or program channel carrying a different program stream.

Additionally or alternatively, in certain embodiments, multiple video content programs carried by a program stream in an enhanced transport stream may represent video data for a main media content program (e.g., a television program) and video data for a video billboard configured for scheduled display by an access device presenting the main media content program. For example, the multiple video content programs may include a first video content program including video data for a main media content program and a second video content program including video data for a video billboard scheduled for display at one or more particular points within the presentation of the main media content program. The video billboard may include a notification message (e.g., a notification of an upcoming broadcast of another media content program), a sponsorship message (e.g., a message indicating one or more sponsors of the main media content program), an advertisement, and/or any other message that may be displayed within a video billboard on a display screen. The access and presentation of the video billboard may be performed without the access device selecting (e.g., without tuning to) a different program stream and/or program channel carrying a different program stream.

Additionally or alternatively, in certain embodiments, multiple video content programs carried by a program stream in an enhanced transport stream may represent video data for a main media content program and video data for one or more advertisements (e.g., one or more targeted advertisements). For instance, the multiple video content programs may include a first video content program including video data for a main media content program and a second video content program including video data for one or more advertisements. As an example, the multiple video content programs may include a first video content program including video data for a main media content program, a second video content program including video data for a first advertisement, and a third video content program including video data for a second advertisement. As another example, the multiple video content programs may include a first video content program including video data for a main media content program, a second video content program including video data representing a first camera view of an advertisement, and a third video content program including additional video data representing a second camera view of the advertisement.

An access device that receives the enhanced transport stream may access the second video content program to access and present video data for an advertisement without the access device selecting (e.g., without tuning to) a different program stream and/or program channel carrying a different program stream. In some examples, the advertisement may be configured for scheduled display by the access device presenting the main media content program. To illustrate, the access device may present video data representative of a main media content program. The enhanced transport stream may include data representative of an advertisement break in the main media content program. The access device may detect the advertisement break and respond by accessing and presenting video data representative of the advertisement.

In certain embodiments, the program stream that carries the first video content program including video data for the main media content program may also carry the second video content program including video data for one or more advertisements only during the advertisement break. Hence, outside of the advertisement break interval, program stream may not carry the second video content program including video data for the advertisement. During the advertisement break interval, the second video content program may be inserted into program stream such that an access device may select and present the second video content program during the advertisement break. Bandwidth of the program stream, or bandwidth from elsewhere in the enhanced transport stream, may be temporally utilized (e.g., reallocated) during the advertisement break interval to support insertion of the second video content program in the program stream during the advertisement break interval. One or more additional video content programs (e.g., additional video content programs carrying video data for additional advertisements or additional camera views of the advertisement) may also be inserted in the program stream during the advertisement break interval.

The inclusion of video data for one or more advertisements in the second video content program carried by the program stream may support targeted advertising. For example, video data for the main media content program carried in the first video content program of the program stream may include video data for a first advertisement configured for presentation during an advertisement break in the main media content program. In addition, the second video content program in the program stream may include video data for a second advertisement. When an enhanced transport stream that includes the program stream is delivered to multiple access devices of a particular geographic region, one or more of the access devices may be configured to select the first advertisement or the second advertisement for presentation. Accordingly, the access devices within the geographic region do not all have to present the first advertisement. One or more of the access devices may select the second advertisement for presentation. The selection of the first or second advertisement may be based on any suitable targeted advertisement factors, user profiles, target data, demographic information, etc.

Additionally or alternatively, in certain embodiments, multiple video content programs carried by a program stream in an enhanced transport stream may include video data for multiple advertisements. For instance, the multiple video content programs may include a first video content program including video data for a first advertisement and a second video content program including video data for a second advertisement. An access device that receives the enhanced transport stream may access the first or second video content program to access and present video data for the first or second advertisement, respectively, without the access device selecting (e.g., without tuning to) a different program stream and/or program channel carrying a different program stream. In some examples, the program stream may also carry one or more additional video content programs that include additional video data related to one or more of the advertisements. Accordingly, an access device that received the enhanced transport stream may access additional video data related to an advertisement carried by the program stream in the enhanced transport stream.

As mentioned, an access device that receives an enhanced transport stream may be configured to detect that the enhanced transport stream includes data representative of multiple program identifiers associated with a single program stream. For example, an access device selecting the program stream may access a PMT (e.g., PMT 504-1 of FIG. 5) corresponding to the program stream and determine that the PMT specifies multiple video program identifiers for the program stream.

In response to a detection of multiple program identifiers for the program stream, the access device may be configured to provide a notification to a user of the access device. The notification may be configured to indicate that the program stream carries multiple video content programs available for selection by the user. For instance, the notification may indicate that video data for one or more additional camera views of an event is available, that multiple video content programs (e.g., video data for multiple advertisements) are available, and/or that additional media content related to a main media content program is available. In some examples, the notification may include a video preview of the additional available video data. In addition, in some examples, the notification may include a selectable option that may be selected by a user to trigger access and presentation of the additional video data.

In certain examples, notification may be provided within a display of a graphical user interface by an access device. For example, the access device may select and process an advertisement carried by a program stream. The access device may generate and include a notification in a graphical user interface to indicate to a user of the access device that additional camera views of the advertisement are available in the program stream.

Figure 6:
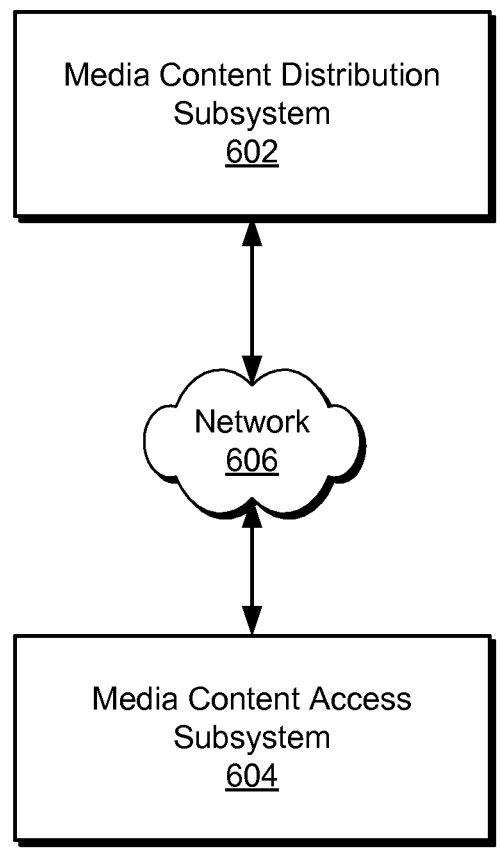
FIG. 6 illustrates an exemplary implementation of the media content delivery system of FIG. 1 according to principles described herein.

Several exemplary implementations of system 100 will now be described. FIG. 6 illustrates an exemplary implementation 600 of the media content delivery system of FIG. 1 in which a media content distribution subsystem 602 (or simply "distribution subsystem 602") is communicatively coupled to a media content access subsystem 604 (or simply "access subsystem 604"). Any of the facilities 102-110 of system 100 may be implemented on one or both of distribution subsystem 602 and access subsystem 604. In certain embodiments, for example, facilities 102, 104, and 110 may be implemented by distribution subsystem 602, and facilities 106 and 108 may be implemented by access subsystem 604.

Access subsystem 604 and distribution subsystem 602 may communicate using any suitable communication technologies, devices, networks, media, and protocols supportive of remote data communications. For example, as shown in FIG. 6, distribution subsystem 602 may be configured to communicate with access subsystem 604 over a network 606 (and communications links thereto). Network 606 may include one or more networks or types of networks capable of carrying communications and/or data signals between distribution subsystem 602 and access subsystem 604. For example, network 606 may include, but is not limited to, a cable network, optical fiber network, hybrid fiber coax network, wireless network (e.g., a Wi-Fi and/or mobile telephone network), satellite network, wireless broadcast network (e.g., a satellite media broadcasting network or terrestrial broadcasting network), subscriber television network, a provider-specific network (e.g., a Verizon® FIOS® network), the Internet, an intranet, local area network, any other suitable network, and any combination or sub-combination of these networks.

Distribution subsystem 602 and access subsystem 604 may communicate over network 606 using any suitable communication technologies, devices, media, and protocols supportive of remote data communications, including, but not limited to, data transmission media, communications devices, Transmission Control Protocol ("TCP"), Internet Protocol ("IP"), Hypertext Transfer Protocol ("HTTP"), Hypertext Transfer Protocol Secure ("HTTPS"), Session Initiation Protocol ("SIP"), Simple Object Access Protocol ("SOAP"), Real-Time Transport Protocol ("RTP"), User Datagram Protocol ("UDP"), Global System for Mobile Communications ("GSM") technologies, Code Division Multiple Access ("CDMA") technologies, Evolution Data Optimized Protocol ("EVDO"), Time Division Multiple Access ("TDMA") technologies, radio frequency ("RF") signaling technologies, wireless communication technologies (e.g., Bluetooth, Wi-Fi, etc.), optical transport and signaling technologies, live transmission technologies (e.g., media streaming technologies), in-band and out-of-band signaling technologies, and other suitable communications technologies.

Distribution subsystem 602 may be configured to transmit, and access subsystem 604 may be configured to receive, one or more enhanced transport streams carrying media content. Access subsystem 604 may be configured to receive and process an enhanced transport stream in any of the ways described herein, or in any other suitable way, to facilitate access by a user to the media content carried in the enhanced transport stream. To this end, access subsystem 604 may present the media content for experiencing (e.g., viewing) by a user, record the media content, and/or perform any other operation associated with the media content as may serve a particular implementation.

Figure 7:
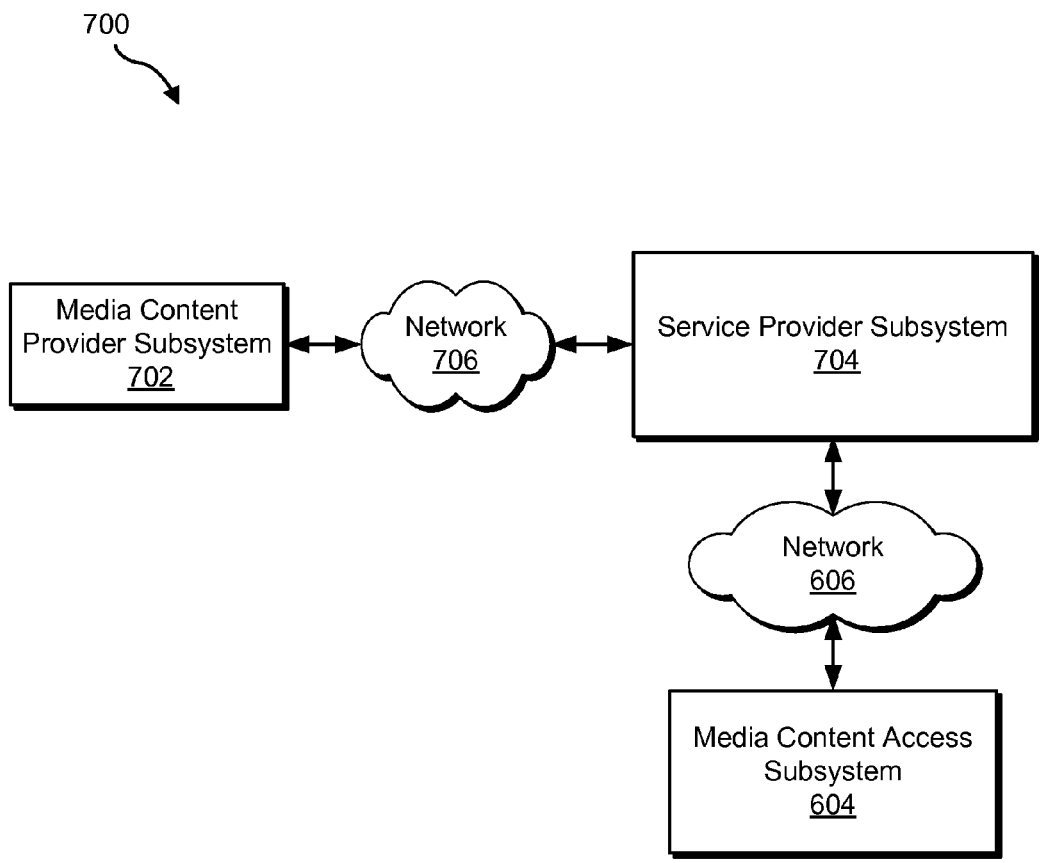
FIG. 7 illustrates another exemplary implementation of the media content delivery system of FIG. 1 according to principles described herein.

In certain embodiments, distribution subsystem 602 may include a media content provider subsystem operated by a media content provider and/or a service provider subsystem operated by a service provider (e.g., a television service provider). As an example, FIG. 7 illustrates another exemplary implementation 700 of the media content delivery system of FIG. 1 according to principles described herein. Implementation 700 may include a media content provider subsystem 702, a service provider subsystem 704, and media content access subsystem 604. Media content provider subsystem 702 and service provider subsystem 704 may be configured to communicate with one another by way of network 706. Service provider subsystem 704 and access subsystem 604 may be configured to communicate with one another by way of network 606. Service provider subsystem 704 may facilitate delivery of media content provided by media content provider subsystem 702 to access subsystem 604.

Media content provider subsystem 702, service provider subsystem 704, and access subsystem 604 may communicate using any suitable communication technologies, devices, networks, media, and protocols supportive of remote data communications. For example, media content provider subsystem 702 and service provider subsystem 704 may communicate over network 706 and service provider subsystem 704 and access subsystem 604 may communicate over network 606 using any communication platforms and technologies suitable for transporting media content and/or communication signals, including known communication technologies, devices, transmission media, and protocols supportive of remote data communications, including any of those mentioned herein.

Networks 706 and 606 may each include one or more networks or types of networks (and communication links thereto) capable of carrying communications, media content, and/or data signals between media content provider subsystem 702, service provider subsystem 704, and access subsystem 604. For example, networks 706 and 606 may each include, but is not limited to, one or more of the networks and/or combinations or sub-combinations of the networks mentioned herein.

In certain embodiments, media content provider subsystem 702 may be configured to generate and transit one or more enhanced media content transport streams to service provider subsystem 704, which may receive and transmit one or more of the enhanced media content transport streams to access subsystem 604.

Additionally or alternatively, media content provider subsystem 702 may be configured to generate and transmit one or more standard media content transports streams to service provider subsystem 704, which may receive and convert one or more of the standard media content transport streams to one or more enhanced media content transport streams in any of the ways described herein. For example, service provider subsystem 704 may dynamically insert at least one additional media content program into a program stream included in the transport stream, at least one additional program identifier for the additional media content program, and information (e.g., into an elementary data stream) indicating that the program stream includes multiple video content programs and how the multiple video content programs are to be selected and/or processed by access subsystem 604. Service provider subsystem 704 may then transmit the enhanced transport stream including the inserted data to access subsystem 604.

Access subsystem 604 may be configured to receive and process an enhanced media content transport stream in any of the ways described herein. Access subsystem 604 may include or be implemented by one or more access devices associated with one or more end users (e.g., subscribers to one or more services made accessible over network 606).

Figure 8:
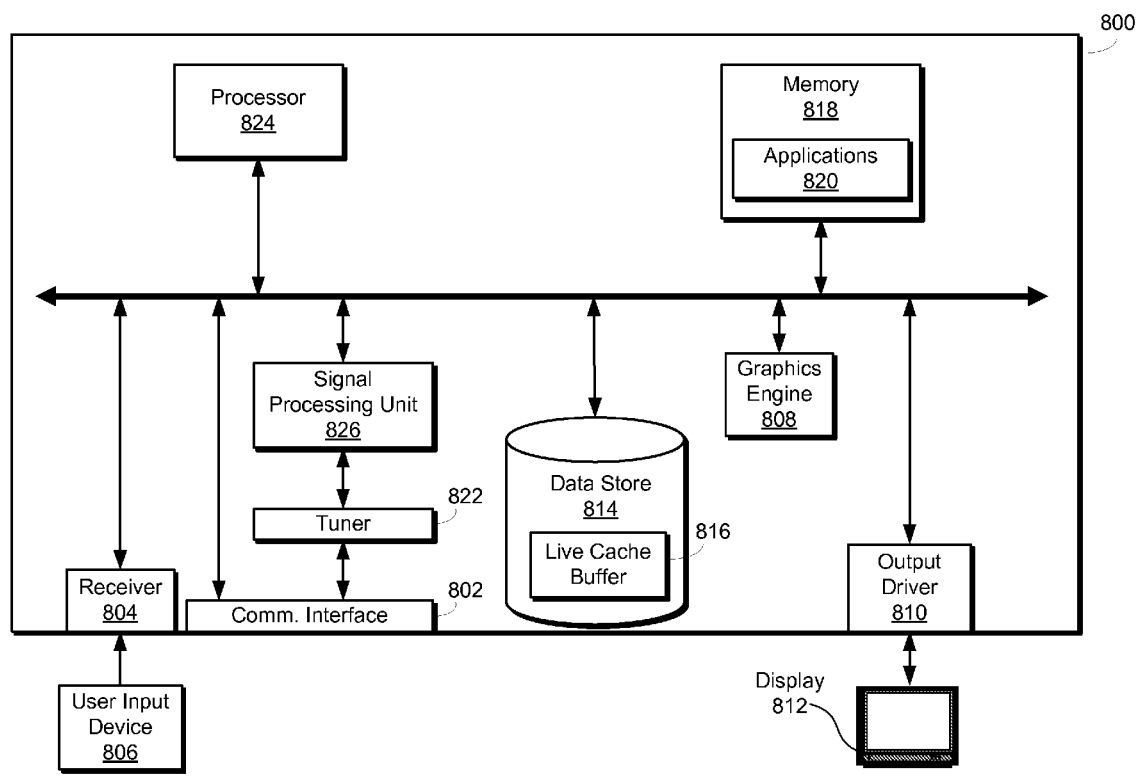
FIG. 8 illustrates an exemplary media content access device according to principles described herein.

FIG. 8 illustrates an exemplary media content access device 800 (or simply "device 800") having access subsystem 604 implemented thereon. Device 800 may be configured to perform one or more of the media content access processes and/or operations described herein. Device 800 may include, but is not limited to, a set-top-box device, a digital video recorder ("DVR") device, a multi-room DVR device, a media content processing device, a communications device, a mobile device (e.g., a mobile phone device), a handheld device, a personal computer, a phone device, a personal-digital assistant device, a gaming device, a television device, and/or any device configured to perform one or more of the media content access processes and/or operations described herein.

As shown in FIG. 8, device 800 may include a communication interface 802 configured to receive media content and/or data (e.g., an enhanced media content transport stream and/or any other data associated with media content) in any acceptable format from distribution subsystem 602 and/or service provider subsystem 704, or from any other suitable external source. Communication interface 802 may include any device, logic, and/or other technologies suitable for receiving signals and/or data representative of media content and/or other types of media content or data. Communication interface 802 may be configured to interface with any suitable communication media, protocols, and formats, including any of those mentioned above.

Device 800 may include a receiver 804 configured to receive user input signals from a user input device 806. User input device 806 may include, for example, a remote control device or any other suitable input device and may be configured to communicate with receiver 804 via a wireless link, electrical connection, or any other suitable communication link.

Device 800 may include a graphics engine 808 and an output driver 810. Graphics engine 808 may be configured to generate graphics to be provided to output driver 810, which may be configured to interface with or drive a display 812. Output driver 810 may provide output signals to display 812, the output signals including graphical media content (e.g., media content) generated by graphics engine 808 and to be presented by display 812 for experiencing by a user. For example, output driver 810 may provide data representative of a graphical user interface ("GUI") including a program guide view or a media playback view to display 812 for presentation to the user. Graphics engine 808 and output driver 810 may include any combination of hardware, software, and/or firmware as may serve a particular implementation.

Data store 814 may include one or more data storage media, devices, or configurations and may employ any type, form, and combination of storage media. For example, data store 814 may include, but is not limited to, a hard drive, network drive, flash drive, magnetic disc, optical disc, or other non-volatile storage unit. Media content and/or data associated with media content may be temporarily and/or permanently stored in data store 814.

Data store 814 is shown to be included within device 800 in FIG. 8 for illustrative purposes only. It will be understood that data store 814 may additionally or alternatively be located external to device 800.

Data store 814 may include one or more live cache buffers 816. Live cache buffer 816 may additionally or alternatively reside in memory 818 or in a storage device external to device 800. In some examples, media content data may be temporarily stored in live cache buffer 816 to facilitate recording of media content and/or presentation of media content in one or more trick play modes.

Device 800 may include memory 818. Memory 818 may include, but is not limited to, FLASH memory, random access memory ("RAM"), dynamic RAM ("DRAM"), other suitable computer-readable media, or any combination or sub-combination thereof. In some examples, one or more applications 820 configured to run on or otherwise be executed by device 800 may reside in memory 818.

Device 800 may include one or more tuners 822. Tuner 822 may be configured to selectively receive media content carried on a particular media content channel (e.g., a media program channel) such that the media content may be processed by device 800. For example, tuner 822 may be configured to tune to a media program channel and/or a program stream carried thereon. In some examples, media content received by tuner 822 may be temporarily buffered, or stored, in the live cache buffer 816. If there are multiple tuners 822, there may be a live cache buffer 816 corresponding to each of the tuners 822.

While tuner 822 may be used to receive certain media content-carrying signals transmitted by service provider subsystem 104, device 800 may be configured to receive other types of media content signals (including media content signals and/or program guide data signals) from distribution subsystem 602 and/or service provider subsystem 704, or from one or more other sources without using a tuner. For example, service provider subsystem 104 may transmit digital streams of data packets (e.g., Internet Protocol ("IP") based data packets) that can be received without using a tuner. For such types of media content signals, communication interface 802 may receive and forward the signals directly to other components of device 800 (e.g., processor 824 or signal processing unit 826) without the signals going through tuner 822. For an IP-based signal, for example, signal processing unit 826 may function as an IP receiver.

Device 800 may include at least one processor, such as processor 824, configured to control and/or perform one or more operations of device 800. Device 800 may also include a signal processing unit 826 configured to process incoming media content. Signal processing unit 826 may be configured, for example, to receive and process an enhanced media content transport stream, and to demodulate and parse encoded digital media content carried in the enhanced transport stream. In some examples, device 800 may include one or more signal processing units 826 corresponding to each of the tuners 822.

Figure 9:
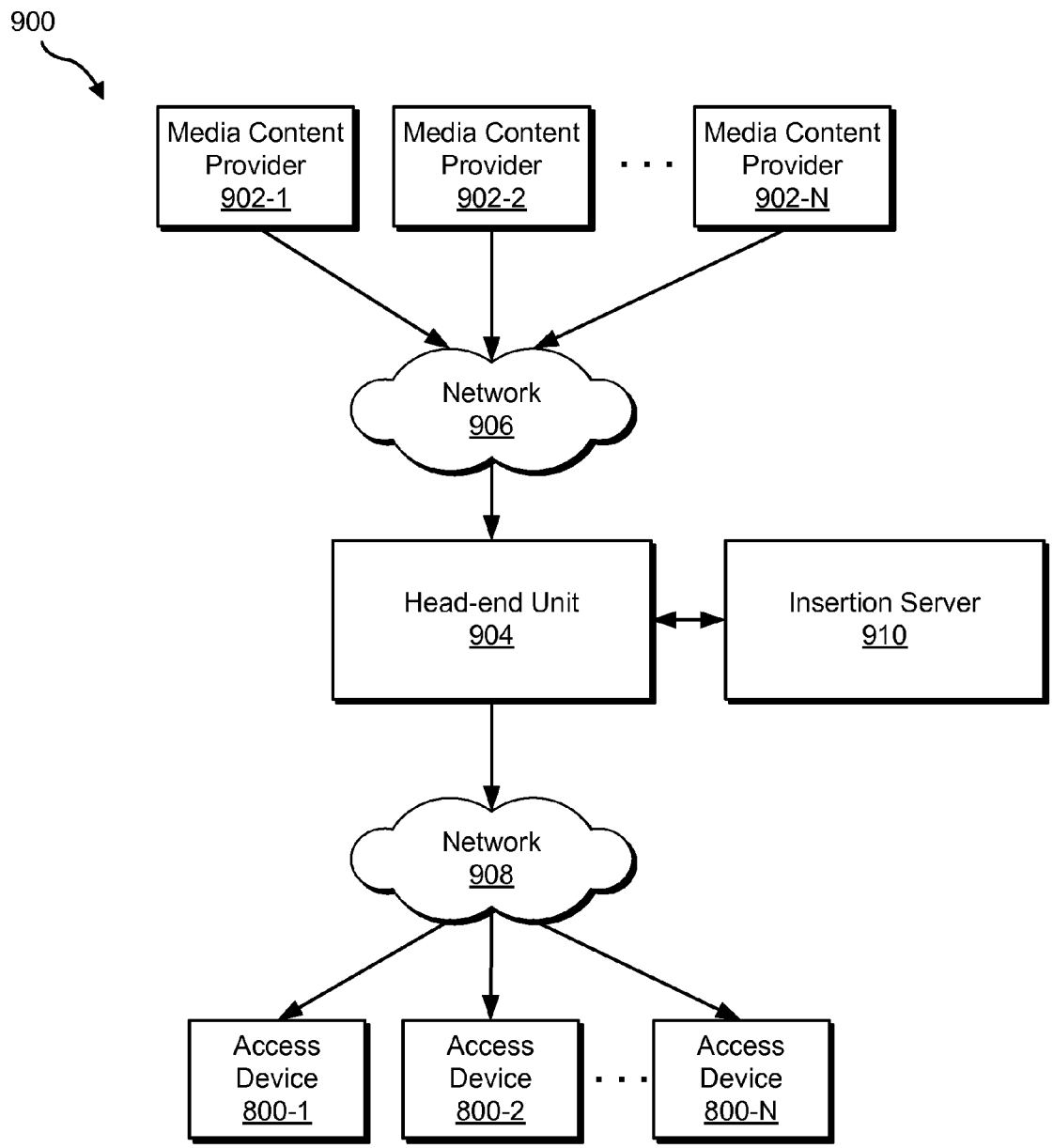
FIG. 9 illustrates another exemplary implementation of the media content delivery system of FIG. 1 according to principles described herein.

FIG. 9 illustrates another exemplary implementation 900 of the media content delivery system of FIG. 1 in which media content provider subsystem 702 of FIG. 7 is implemented by a plurality of media content providers 902-1 through 902-N (collectively referred to herein as "media content providers 902") configured to communicate with a head-end unit 904 via a network 906. Head-end unit 904 may be owned, operated, or otherwise associated with a service provider (e.g., a subscriber television service provider) and may be configured to communicate with a plurality of access devices 800-1 through 800-N (collectively referred to herein as "access devices 800") via a network 908. Networks 906 and 908 may include any of the networks described herein. In some examples, networks 906 and 908 comprise a single network.

In some examples, media content providers 902 may be configured to provide one or more media content transport streams to head-end unit 904 via network 906. In some alternative examples, one or more of the media content providers 902 may be configured to provide one or more media content transport streams directly to head-end unit 904 without transmitting data via network 906. The media content transport streams may include standard media content transports streams, enhanced media content transport streams, or a combination thereof.

Head-end unit 904 may be configured to receive the media content transport streams from media content providers 9-2 and distribute the media content transport streams to access devices 800 via network 908. An exemplary head-end unit 904 may include a video head-end and/or a video hub office configured to acquire and distribute national, regional, and/or local broadcast and/or video-on-demand media content to access devices 800.

In some examples, head-end unit 904 may be configured to receive one or more enhanced media content transport streams from one or more media content providers 902 and distribute the enhanced media content transport streams to access devices 800. Additionally or alternatively, head-end unit 904 may receive one or more standard media content transport streams from one or more media content providers 902 and convert the standard media content transports stream(s) to enhanced media content transport stream(s) to be distributed to access devices 800. For instance, head-end unit 904 may be communicatively coupled to an insertion server 910, which may be configured to insert additional media content and associated data into a media content transport stream as described herein such that an enhanced media content transport stream is generated.

Figure 10:
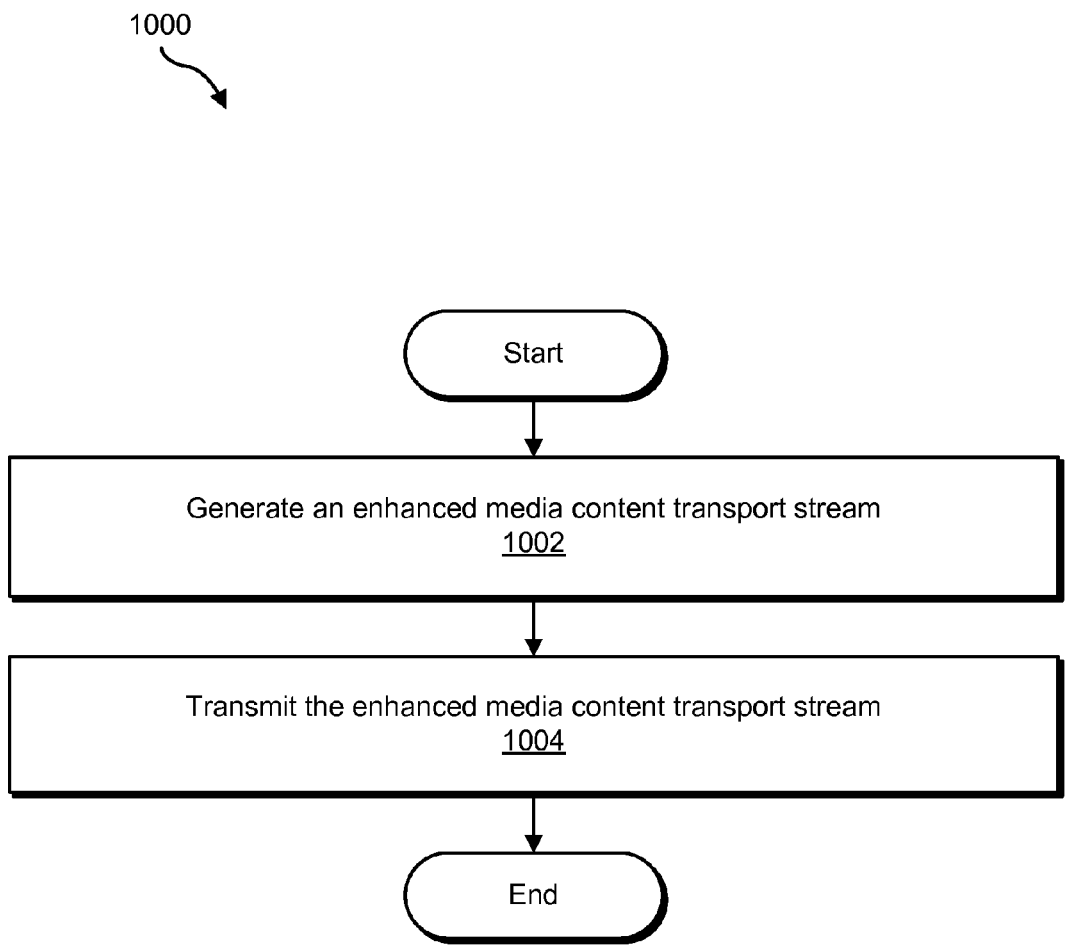
FIG. 10 illustrates an exemplary media content delivery method according to principles described herein.

FIG. 10 illustrates an exemplary media content delivery method 1000. While FIG. 10 illustrates exemplary steps according to one embodiment, other embodiments may omit, add to, reorder, combine, and/or modify any of the steps shown in FIG. 10. The steps shown in FIG. 10 may be performed by any component or combination of components of system 100 and/or any exemplary implementation of system 100 described herein.

In step 1002, an enhanced media content transport stream is generated. Step 1002 may be performed in any of the ways described herein. For example, generation facility 102 may generate an enhanced transport stream from raw media content data or by inserting additional data into a standard transport stream.

In step 1004, the enhanced media content transport stream is transmitted. Step 1004 may be performed in any of the ways described herein. For example, transmission facility 104 may transmit data representative of the enhanced media content transport stream to one or more receivers. In certain embodiments, step 1004 may include media content provider subsystem 702 and/or a media content provider 902 transmitting the enhanced transport stream to service provider subsystem 704 and/or head-end unit 904. Additionally or alternatively, step 1004 may include service provider subsystem 704 and/or head-end unit 904 transmitting the enhanced transport stream to access subsystem 604 and/or one or more access devices 800.

Figure 11:
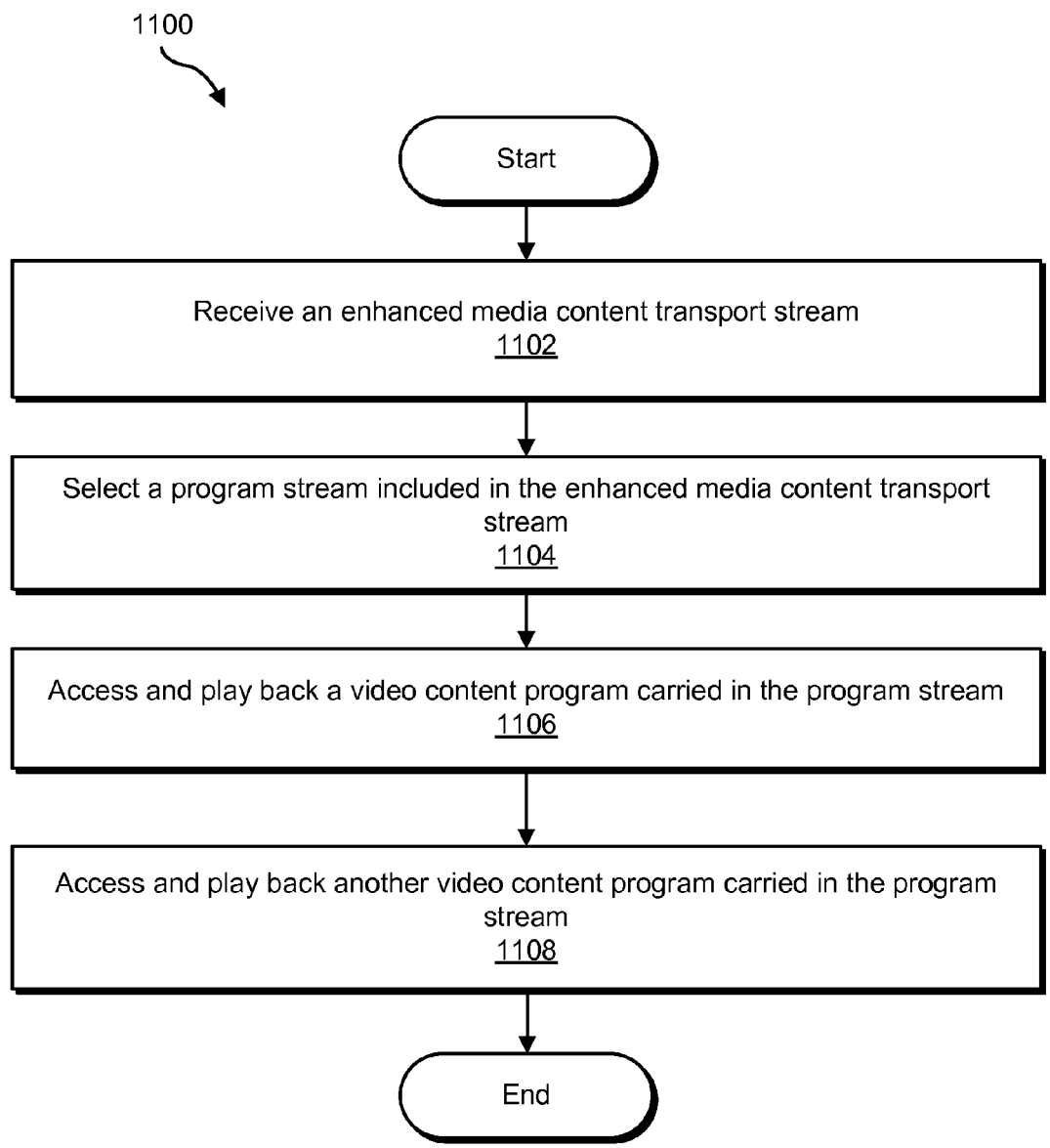
FIG. 11 illustrates another exemplary media content delivery method according to principles described herein.

FIG. 11 illustrates another exemplary media content delivery method 1100. While FIG. 11 illustrates exemplary steps according to one embodiment, other embodiments may omit, add to, reorder, combine, and/or modify any of the steps shown in FIG. 11. The steps shown in FIG. 11 may be performed by any component or combination of components of system 100 and/or any exemplary implementation of system 100 described herein.

In step 1102, an enhanced media content transport stream is received. Step 1102 may be performed in any of the ways described herein. For example, receiver facility 106, access subsystem 604, and/or access device 800 may receive the enhanced transport stream transmitted by transmission facility 104, distribution subsystem 602, service provider subsystem 704, and/or head-end unit 904.

In step 1104, a program stream included in the enhanced media content transport stream is selected. Step 1102 may be performed in any of the ways described herein, including by access subsystem 604 and/or access device 800 tuning to or otherwise selecting a program channel on which the program stream is carried in the enhanced transport stream.

In step 1106, a video content program carried in the program stream is accessed and played back. For example, a first video content program carried by the program stream may be accessed and played back by access subsystem 604 and/or access device 800. In certain embodiments, step 1106 may include utilizing a first program identifier specified in the enhanced transport steam to access and play back the first video content program.

In step 1108, another video content program carried in the program stream is accessed and played back. For example, a second video content program carried by the program stream may be accessed and played back by access subsystem 604 and/or access device 800. In certain embodiments, step 1108 may include utilizing a second program identifier specified in the enhanced transport steam to access and play back the second video content program. Step 1108 may be accomplished without access subsystem 604 and/or access device 800 tuning to another program stream in order to select the second video program stream. In certain embodiments, step 1108 may further include detecting an occurrence of a predefined trigger event and responding to the occurrence of the predefined trigger event by accessing and playing back the second video program stream.

In some examples, step 1108 may include switching from playing back the first video content program to playing back the second video content program. Alternatively, step 1108 may include playing back the first video content program while the first video content program continues to be played back in step 1106.

In some examples, the first video content program may include video data for a first advertisement, and the second video content program may include video data for a second advertisement. Accordingly, access subsystem 604 and/or access device 800 may selectively access and play back either one of the advertisements, or both of the advertisements concurrently.

In other examples, the first video content program may include video data for a first camera view of an advertisement, and the second video content program may include video data for a second camera view of the advertisement. Accordingly, access subsystem 604 and/or access device 800 may selectively access and play back either camera view of the advertisement, or both of the camera views of the advertisement concurrently.

In certain embodiments, one or more of the components and/or processes described herein may be implemented and/or performed by one or more appropriately configured computing devices. To this end, one or more of the systems and/or components described above may include or be implemented by any computer hardware and/or computer-implemented instructions (e.g., software) embodied on a non-transitory computer-readable medium and configured to direct one or more computing devices to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions executable by one or more computing devices. In general, a processor (e.g., a microprocessor) receives instructions, from a tangible computer-readable medium, (e.g., a memory, etc.), and executes those instructions, thereby performing one or more processes, including one or more of the processes described herein. Such instructions may be stored and/or transmitted using any of a variety of known non-transitory computer-readable media.

A non-transitory computer-readable medium (also referred to as a processor-readable medium) includes any non-transitory medium that participates in providing data (e.g., instructions) that may be read by a computer (e.g., by a processor of a computer). Such a non-transitory medium may take many forms, including, but not limited to, non-volatile media and/or volatile media. Non-volatile media may include, for example, optical or magnetic disks and other persistent memory. Volatile media may include, for example, dynamic random access memory ("DRAM"), which typically constitutes a main memory. Common forms of non-transitory computer-readable media include, for example, a floppy disk, flexible disk, hard disk, magnetic tape, any other magnetic medium, a CD-ROM, DVD, any other optical medium, a RAM, a PROM, an EPROM, a FLASH-EEPROM, any other memory chip or cartridge, or any other non-transitory medium from which a computer can read.

Figure 12:
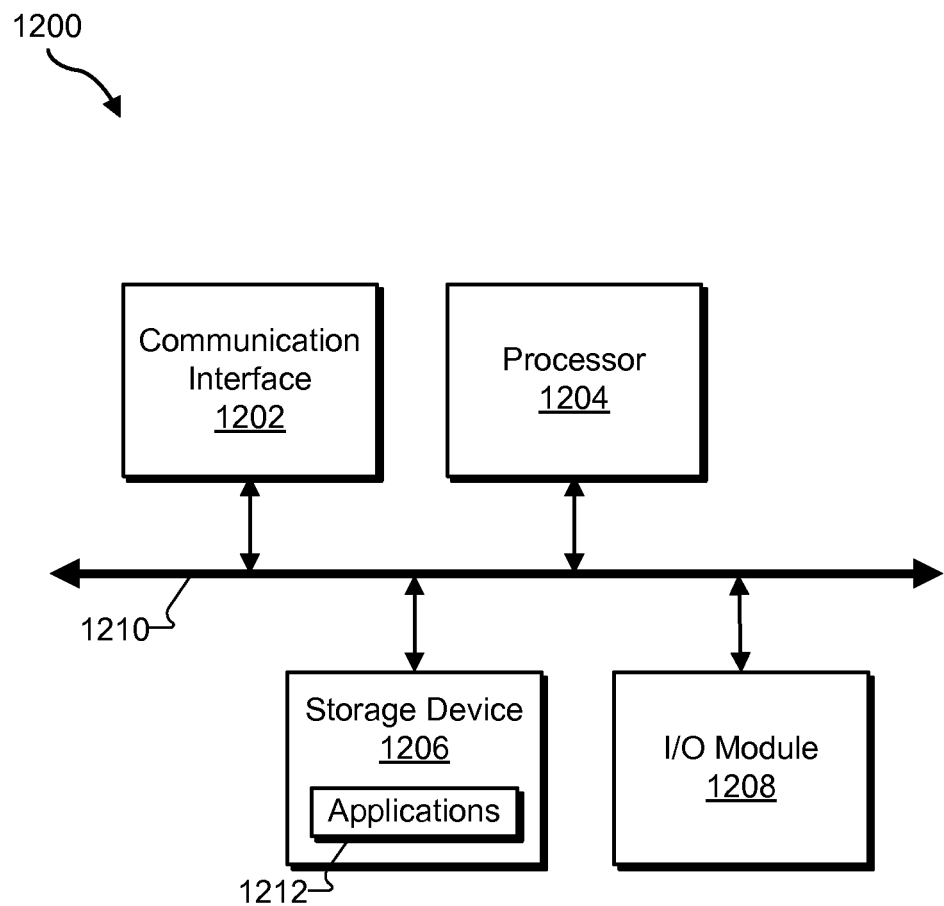
FIG. 12 illustrates an exemplary computing device according to principles described herein.

FIG. 12 illustrates an exemplary computing device 1200 that may be configured to perform one or more of the processes described herein. As shown in FIG. 12, computing device 1200 may include a communication interface 1202, a processor 1204, a storage device 1206, and an input/output ("I/O") module 1208 communicatively connected via a communication infrastructure 1210. While an exemplary computing device 1200 is shown in FIG. 12, the components illustrated in FIG. 12 are not intended to be limiting. Additional or alternative components may be used in other embodiments. Components of computing device 1200 shown in FIG. 12 will now be described in additional detail.

Communication interface 1202 may be configured to communicate with one or more computing devices. Examples of communication interface 1202 include, without limitation, a wired network interface (such as a network interface card), a wireless network interface (such as a wireless network interface card), a modem, and any other suitable interface. Communication interface 1202 may additionally or alternatively provide such a connection through, for example, a local area network (such as an Ethernet network), a personal area network, a telephone or cable network, a satellite data connection, a dedicated URL, or any other suitable connection. Communication interface 1202 may be configured to interface with any suitable communication media, protocols, and formats, including any of those mentioned above.

Processor 1204 generally represents any type or form of processing unit capable of processing data or interpreting, executing, and/or directing execution of one or more of the instructions, processes, and/or operations described herein. Processor 1204 may direct execution of operations in accordance with one or more applications 1212 or other computer-executable instructions such as may be stored in storage device 1206 or another non-transitory computer-readable medium.

Storage device 1206 may include one or more data storage media, devices, or configurations and may employ any type, form, and combination of data storage media and/or device. For example, storage device 1206 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 1206. For example, data representative of one or more executable applications 1212 (which may include, but are not limited to, one or more of the software applications described herein) configured to direct processor 1204 to perform any of the operations described herein may be stored within storage device 1206. In some examples, data may be arranged in one or more databases residing within storage device 1206.

I/O module 1208 may be configured to receive user input and provide user output and may include any hardware, firmware, software, or combination thereof supportive of input and output capabilities. For example, I/O module 1208 may include hardware and/or software for capturing user input, including, but not limited to, a keyboard or keypad, a touch screen component (e.g., touch screen display), a receiver (e.g., an RF or infrared receiver), and/or one or more input buttons.

I/O module 1208 may include one or more devices for presenting output to a user, including, but not limited to, a graphics engine, a display (e.g., a display screen, one or more output drivers (e.g., display drivers), one or more audio speakers, and one or more audio drivers. In certain embodiments, I/O module 1208 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1200. For example, one or more applications 1212 residing within storage device 1206 may be configured to direct processor 1204 to perform one or more processes or functions associated with generation facility 102, transmission facility 104, receiver facility 106, and/or presentation facility 108. Likewise, storage facility 110 may be implemented by or within storage device 1206.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:
1. A method comprising:
   transmitting, by a media content distribution subsystem, an enhanced media content transport stream including at least a single program stream that carries data representative of multiple video content programs;
   wherein the enhanced media content transport stream further includes data specifying multiple video program identifiers for the multiple video content programs, each of the multiple video program identifiers configured to be used by an access subsystem that receives the enhanced media content transport stream to determine whether to process a video packet in the enhanced media content transport stream based on at least one of the multiple video program identifiers for the multiple video content programs; and
   wherein the multiple video content programs comprise
      a first video content program including video data for a main media content program, and
      a second video content program including video data for an advertisement.

2. The method of claim 1, wherein:
the enhanced media content transport stream further includes data representative of an advertisement break in the main media content program; and
data representative of the advertisement is carried in the program stream only during the advertisement break.

3. The method of claim 1, further comprising:
receiving, by the access subsystem, the enhanced media content transport stream;
tuning, by the access subsystem, to a program channel to access the program stream;
accessing and playing back, by the access subsystem, the first video content program carried by the program stream;
detecting an occurrence of a predefined trigger event; and
accessing and playing back, by the access subsystem in response to the occurrence of the predefined trigger event, the second video content program carried by the program stream, without tuning away from the program channel.

4. The method of claim 1, wherein:
the multiple video content programs further comprise a third video content program including additional video data for the advertisement;
the video data in the second video content program represents a first camera view of the advertisement; and
the additional video data in the third video content program represents a second camera view of the advertisement.

5. The method of claim 4, further comprising:
receiving, by the access subsystem, the enhanced media content transport stream;
tuning, by the access subsystem, to a program channel to access the program stream;
detecting, by the access subsystem, that the enhanced media content transport stream includes the multiple program identifiers associated with the program stream; and
providing a notification for a user, the notification indicating that the program stream carries the multiple video content programs.

6. The method of claim 5, wherein the notification indicates that the program stream carries the video data representing the first camera view of the advertisement and the additional video data representing the second camera view of the advertisement.

7. The method of claim 6, further comprising:
accessing and playing back, by the access subsystem, the video data in the second video content program that represents the first camera view of the advertisement;
detecting user input requesting another camera view of the advertisement;
accessing and playing back, by the access subsystem in response to the user input, the additional video data in the third video content program that represents the second camera view of the advertisement, without tuning away from the program channel.

8. The method of claim 1, wherein the enhanced media content transport stream further includes data representative of a single program mapping table associated with the program stream, the program mapping table specifying the multiple video program identifiers for the multiple video content programs.

9. The method of claim 1, wherein the enhanced media content transport stream is an enhanced MPEG-2 transport stream.

10. The method of claim 1, wherein the program stream contains a first elementary video stream that carries the video data included in the first video content program and a second elementary video stream that carries the video data included in the second video content program.

11. The method of claim 1, wherein the program stream contains a single elementary video stream that carries video data included in the first video content program and the video data included in the second video content program.

12. The method of claim 1, further comprising generating, by the media content distribution subsystem, the enhanced media content stream by:
receiving, from a media content provider, a standard media content transport stream that includes the program stream, the program stream in the standard media content transport stream carrying only the first video content program; and
converting the standard media content transport stream into the enhanced media content transport stream by
inserting data representative of the second video content program into the program stream such that the program stream carries data representative of the multiple video content programs, the multiple video content programs including at least the first video content program and the second video content program, and
inserting data representative of an additional program identifier associated with the second video content program into the standard media content transport stream.

13. The method of claim 1, embodied as computer-executable instructions on at least one non-transitory computer-readable medium.

14. A method comprising:
receiving, by a media content access subsystem, an enhanced media content transport stream including
at least a single program stream that carries data representative of multiple video content programs on a program channel, and
data specifying multiple video program identifiers for the multiple video content programs;
tuning, by the media content access subsystem, to the program channel to access the program stream;
determining, by the media content access subsystem, whether to process a video packet in the enhanced media content transport stream based on at least one of the multiple video program identifiers to play back one of the multiple video content programs carried by the program stream; and
utilizing, by the media content access subsystem without tuning to another program channel, another one of the multiple video program identifiers to access and play back another one of the multiple video content programs carried by the program stream.

15. The method of claim 14, wherein the utilizing of another one of the multiple video program identifiers to access and play back another one of the multiple video content programs carried by the program stream is performed by the media content access subsystem in response to a receipt, by the media content access subsystem, of user input requesting playback of the another one of the multiple video content programs carried by the program stream.

16. The method of claim 14, wherein:
the one of the multiple video content programs includes video data for a first advertisement; and
the another one of the multiple video content programs comprises video data for a second advertisement.

17. The method of claim 14, wherein:
the one of the multiple video content programs includes video data for a first camera view of an advertisement; and
the another one of the multiple video content programs comprises video data for a second camera view of the advertisement.

18. A system comprising:
a media content generation facility configured to generate an enhanced media content transport stream including at least a single program stream that carries video data for multiple advertisements, wherein the enhanced media content transport stream further includes data specifying multiple video program identifiers for the multiple advertisements, each of the multiple video program identifiers configured to be used by a media content access device to determine whether to process a video packet in the enhanced media content transport stream; and
a media content transmission facility communicatively coupled to the media content generation facility and configured to transmit data representative of the enhanced media content transport stream.

19. The system of claim 18, further comprising a media content receiver facility communicatively coupled to the media content transmission facility and configured to
receive the enhanced media content transport stream,
select the program stream,
utilize one of the multiple video program identifiers to access and play back one of the multiple advertisements carried by the program stream, and
utilize another one of the multiple video program identifiers to access and play back another one of the multiple advertisements carried by the program stream, without tuning to another program channel.

20. The system of claim 18, wherein the enhanced media content transport stream further includes data representative of a single program mapping table associated with the program stream, the program mapping table specifying the multiple video program identifiers for the multiple advertisements.

* * * * *